July 7, 1970            J. J. NEHEZ            3,519,839

POWER SUPPLY FOR LOAD PRESENTING VARIABLE CURRENT DEMAND

Filed Jan. 17, 1968

INVENTOR.
JAMES J. NEHEZ

BY *Dybvig and Dybvig*

HIS ATTORNEYS

United States Patent Office 3,519,839
Patented July 7, 1970

3,519,839
POWER SUPPLY FOR LOAD PRESENTING
VARIABLE CURRENT DEMAND
James J. Nehez, 808 Brubaker Drive,
Kettering, Ohio 45429
Filed Jan. 17, 1968, Ser. No. 698,589
Int. Cl. G05f 1/60
U.S. Cl. 307—35                                   7 Claims

ABSTRACT OF THE DISCLOSURE

An apparatus to supply an adjustable voltage to a load presenting a widely varying current demand comprises a voltage divider across a direct current power supply and an adjustable wiper on the voltage divider providing base bias to an emitter-follower cascade. The load, which may comprise a series of separately switchable lamps, is placed between the final emitter of the cascade and one side of the power supply. Base resistors in the emitter-follower cascade protect the circuit against transients and emitter resistors, including a fixed load resistance in the final emitter circuit of the cascade, protect the circuit against collector-to-base breakdown in the event of load removal. The circuit elements, except for the voltage divider, are assembled to a chassis having four terminal connections, two of which provide connections to the voltage divider, which may be remotely located.

---

This invention relates to a direct current power control responsive to the current demands of a load and more particularly to a power control having a voltage control element which dissipates only nominal power; however, the invention is not necessarily so limited.

Direct current power supplies in which an adjustable voltage is to be supplied to a load typically utilize a voltage divider in the form of a rheostat having an adjustable wiper connected to the load. Depending upon the position of the adjustable wiper, a first portion of the available power is used beneficially by the load and the remainder of the available power is dissipated by the generation of heat in the voltage divider or rheostat. The result is that the element which provides the voltage control, i.e. the rheostat, is also a heat generating element which requires an associated heat removal means. For many applications, the heat generating rheostat and its attendant heat removal means are objectionable either because locally too massive or because inconveniently located or both.

Numerous applications thus exist in which it is desirable to separate the voltage control function from the heat dissipation function. An example is the aircraft instrument panel. The pilot of an aircraft desires to adjust the illumination level of his instrument panel as required by the ambient light conditions. To achieve this, however, a direct current voltage adjustment means is needed at the instrument panel. With prior art techniques, this necessitates a heat generating rheostat at he insrument panel. Such rheostats, being bulky, unnecessarily crowd the instrument panel and produce a heat source in an area where the presence of a heating element is neither desired nor required.

An object of the present invention is to provide a new and improved direct current power control in which the heat generating function is separated from the voltage control function.

Another object of the present invention is to provide a direct current power control in which the current demands of a load which presents varying current demands are automatiaclly supplied in proportion to the demands.

Still another object of the present invention is to provide a new and improved chassis arrangement for an adjustable direct current power control.

Other objects and advantages reside in the arrangement of parts, the combination thereof, and the mode of operation, as will become more apparent from the following description.

Figure 1:
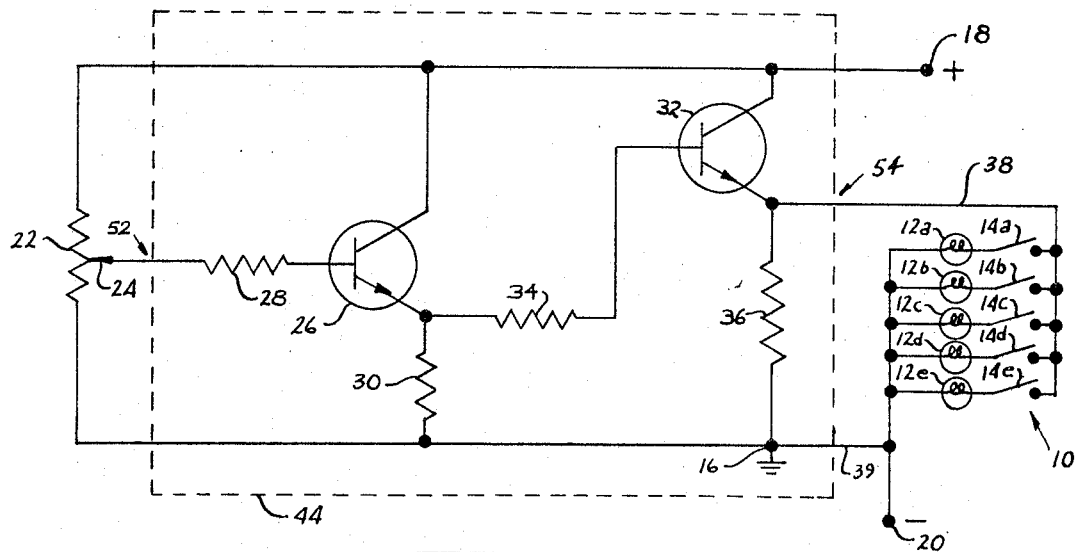

In the drawing, FIG. 1 is a schematic illustration of an electrical circuit embodying the present invention.

Figure 2:
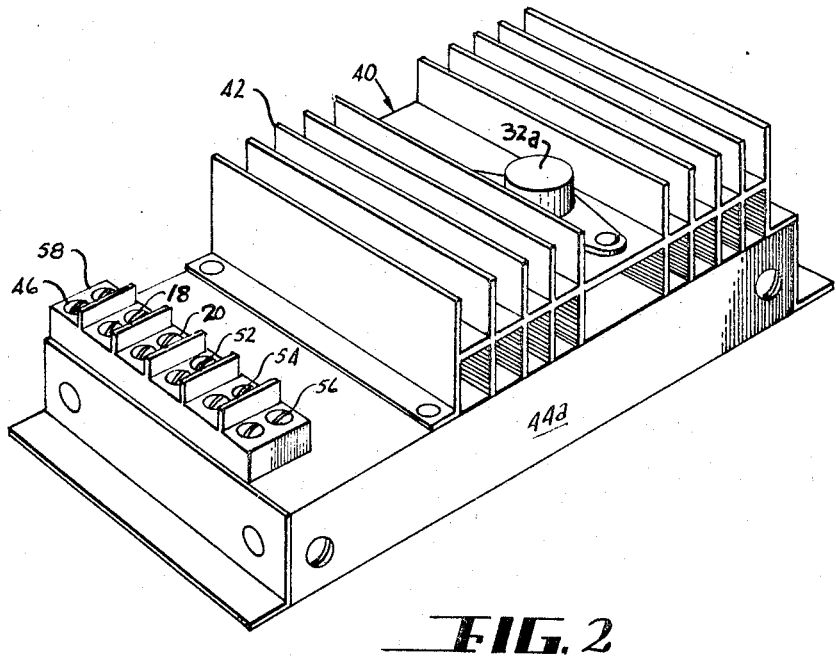

FIG. 2 is a perspective view illustarting a chassis arrangement to house a portion of the circuit of FIG. 1.

Referring to the drawing in greater detail, the reference numeral 10 designates a load assembly of the type requiring the capabilities of the subject invention. Such load assembly comprises a plurality of electric lamps 12a, 12b, 12c, 12d and 12e. Separate interrupter switches 14a, 14b, 14c, 14d and 14e, one for each lamp, enable individual control of the operating states of the lamps. As an example, each of the lamps 12a through 12e may represent a dial light on an aircraft instrument panel. The switches 14a through 14e, also located on the instrument panel, enable the pilot to switch on those dial lights needed and to switch off those dial lights not neded.

The power supply for the lamps 12a through 12e comprises a source of direct current power, not shown, which is connected across positive and negative voltage input terminals, 18 and 20 respectively. As will be more fully described, the terminal 20 is common to a chassis ground represented at 16 and accordingly the negative side of the voltage source is grounded.

A resistor 22 having an adjustable wiper 24 is placed across the voltage supply to the terminals 18 and 20. The resistance of resistor 22 is made large in relation to the supply voltage so as to have a small power dissipation, preferably less than one watt.

The wiper 24 supplies voltage bias to the base of an NPN transistor 26 through a resistor 28. The transistor 26 has its collector connected to the positive side of the voltage supply and its emitter connected to the negative side of the voltage supply through resistor 30.

A second NPN transistor 32 is coupled to the transistor 26 in emitter-follower relation. Thus, resistor 34 connects the emitter of transistor 26 to the base of transistor 32, the collector of transistor 32 is connected directly to the positive side of the voltage supply, and the emitter of transistor 32 is connected to the negative side of the voltage supply through resistor 36.

The load 10 is connected across resistor 36 by means of the conductors 38 and 39. The resistor 36 is thus in parallel with each of the plural load circuits represented by the lamps 12a through 12e and forms a permanent fixed load in the emitter circuit of transistor 32.

Although the circuit has been illustrated and described as including NPN transistors, those skilled in the art will recognize that PNP transistors can be employed as well; in which case, the supply voltage would be of opposite polarity to that shown in FIG. 1. For most aircraft lighting installations, however, a negative ground is specified and PNP transistors are therefore unsuitable.

A control circuit as illustrated in FIG. 1 was constructed for operation with a 28.5 volt direct current source voltage using the following components:

Transistor 26—RCA type 30250 (NPN)
Transistor 32—RCA type 2N3055 (NPN)
Resistor 22—2000 ohms
Resistor 28—470 ohms
Resistor 30—7500 ohms
Resistor 34—10 ohms
Resistor 36—7500 ohms The transistor 32 was mounted on a heat sink rated at twenty-nine watts dissipation with a 40° C. temperature rise above ambient.

In circuit operation, the setting of the wiper 24 on resistor 22 establishes a base bias on transistor 26 to which the circuit responds with emitter currents in the transistors 26 and 32 sufficient to satisfy the current demand of the load, as established by the voltage appearing at the emitter of transistor 32.

In comparison to the load current thus established, only small currents pass through the resistors 28 and 34 since the cascaded transistors 26 and 32 require only small base currents to supply the current through the load. As a result, the voltage drops across the resistors 28 and 34 are small and the voltage appearing at the emitter of transistor 32 closely "follows" the voltage tapped from the resistor 22.

Assuming the load to comprise one or more of the lamps 12a through 12e, as illustrated in FIG. 1, the setting of the wiper 24 determines the voltage supply to those lamps connected in the circuit and thus controls the brightness of the connected lamps.

If, after a given brightness level has been established by adjustment of the wiper 24, the operator desires to add one or more lamps to the load circuit or remove one or more lamps from the circuit, this can be achieved through operation of the switches 14a through 14e and, as will be explained, is achieved without appreciably affecting the brightness level initially established by the setting of the wiper 24. The addition of a lamp to the load circuit provides a new current path from the emitter of transistor 32 to ground thereby decreasing the aggregate load resistance in the emitter circuit of transistor 32. This decrease in the load resistance increases the emitter-to-base biases on the transistors 26 and 32, thus allowing additional current flow in the base circuits for transistors 26 and 32. This, in turn, permits an increased current flow in the collector-to-emitter circuits of the transistors 26 and 32. As a result, the increased current demand presented by the addition of a lamp to the load circuit is immediately satisfied by an increased collector current in the transistor 32 and a correction in the emitter voltages of the transistors 26 and 32 to levels only slightly lower than their initial levels. The emitter voltage correction is only slight for the reason that the increased emitter current from transistor 32 promptly raises the voltage drop across the new load to substantially the load voltage that existed before the new load was added. In like manner, the removal of a lamp from the load circuit by the opening of its switch has the effect of increasing the resistance in the emitter circuit of transistor 32, thus decreasing the emitter-to-base biases and the base currents of transistors 26 and 32, and thereby decreasing the collector currents for these transistors, especially transistor 32.

The degree to which the circuit can automatically compensate for the varying current demands presented by an increase or a decrease in the number of lamps connected in the load circuit without an appreciable change in the brightness of other lamps in the load circuit depends primarily upon the operating characteristics of the transistor 32, especially the rate at which the voltage drop in the collector-to-emitter circuit of transistor 32 changes with changing current demands. By careful selection of the transistor type employed for the transistor 32, the voltage change across the collector-to-emitter circuit of transistor 32 was limited to approximately 0.3 volt per ampere change in the load circuit. This small change in the voltage available at the emitter of transistor 32 and thus to the load circuit is practically unobservable visually and can be considered negligible in its effect on light output.

The resistors 30 and 36 protect against collector-to-base breakdown should the load be removed. Resistor 36, in particular, permits the circuit to be connected to a supply voltage even when the other load elements are disconnected from the load circuit. In case of a failure of the transistor 32, the resistor 30 protects transistor 26.

The resistors 28 and 34 aid in protecting the circuit against transients arising in the voltage supply. The relative resistance values for these resistors are established by reference to the current transfer ratio, or beta, for the transistor 26. Thus, the current through the resistor 34 is approximately equal to the beta of transistor 26 times the current through resistor 28. To equally divide the voltage drops in these base resistors, the resistor 28 should have an ohmic resistance approximately equal to the ohmic resistance of the resistor 34 multiplied by the beta of transistor 26. For satisfactory protection against source voltage transients without undue distortion of the other circuit characterisics, the ohmic resistance of resistor 28 should be not more than three times, nor less than one-third, the ohmic resistance of resistor 34 multiplied by the beta of transistor 26.

The described circuit offers the important advantage that control over the voltage applied o the load resides in the resistor 22 which generates only a nominal amount of heat. The only circuit element generating an amount of heat sufficient to warrant a supplementary heat sink or the like is the transistor 32. To take full advantage of this circuit characteristic, it is found desirable to assemble those circuit components appearing within the broken line rectangle 44 of FIG. 1 in a chassis which is of the type illustrated at 44a in FIG. 2 and which is preferably of conductive material. Mounted on top of the chassis is a heat sink 40 having numerous fins 42 so as to have a large surface area in contact with the ambient air. Mounted to the heat sink 40 in heat exchanging relation thereto is the transistor 32.

The chassis 44a is provided with four terminals 18, 20, 52 and 54 mounted upon an insulator 58 secured by screws 46 and 56. The terminals 18 and 20 comprise the previously described voltage input terminals. The functional circuit locations for the terminals 52 and 54 are indicated by arrows, so designated, in FIG. 1. Thus, chassis terminal 52 receives a conductor from the wiper 24 on the voltage divider. Chassis terminal 54 receives a conductor 38 for applying the voltage at the emitter of transistor 32 to the load elements. The input terminal 20 is connected through conductor 39 to the chassis 44a to provide the chassis ground indicated at 16 in FIG. 1.

As previously indicated, the circuit which is in part housed by the chassis 44a has particular utility in applications such as the control of the brightness of the dial lights on an aircraft instrument panel. For such applications, those skilled in the art will recognize that FIG. 1 does not precisely represent the circuitry that would exist in a conventional airframe.

Thus, in conventional airplanes, the negative side of the supply voltage is "grounded" to the airframe. The instrument panel lights are then operated between a connection to the positive side of the voltage supply and the airframe directly. Thus, there is no return line from the lamps to the negative side of the power supply other than that provided by the conductivity of the airframe. Also, the terminal 20 on the chassis 44a is automatically connected to the airframe ground when the voltage input terminal 20 is connected to the already grounded negative side of the voltage source. The chassis ground illustrated at 16 provides a secondary airframe ground as soon as the chassis is mounted to the airframe, this because the chassis as well as the airframe is ordinarily electrically conductive. This secondary ground is ordinarily not needed, except to assure a local ground to the airframe for the control circuitry. Those skilled in the art will also recognize that the illustrated interrupter switches in the load circuit represent only one type of many and diverse types of devices for varying a load current path and thereby changing the load current demand.

While the invention has been described with particular reference to a 28.5 volt source voltage, it is to be understood that, by proper selection of circuit components, the circuit can be designed to operate anywhere within a wide range of supply voltages. More importantly, a single assembly of components such as those specifically identified herein will provide a circuit which, without modification or change, can be operated over a range of supply voltages.

An important benefit of the present invention is that the load voltage control provided by the voltage divider covers the entire range of possible operating voltages from zero (a true off position with zero current through the load) to very nearly the full voltage available from the voltage source.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination, a load assembly presenting a variable current demand and a demand responsive control for said load assembly; said control including terminals for connection to a source of voltage, first and second transistors having common collector connection to one of said terminals, first means including a first protective resistor connecting the base of said first transistor to said one of said terminals, and second means including a second protective resistor connecting the base of said second transistor to the emitter of said first transistor, the resistance value of said first protective resistor divided by the resistance value of said second protective resistor being not more than three times and not less than one-third the beta of said first transistor, said load assembly being connected between the emitter of said second transistor and the other of said terminals, said load assembly including a plurality of load elements and means in series with said load elements to randomly change the current demanded by said load elements.

2. The combination of claim 1, wherein said means to randomly change the current demanded by said load elements is a plurality of interrupter switches each series connected with a different one of said load elements.

3. The combination of claim 1 including a voltage divider across said terminals and wherein said first means comprises a wiper on said voltage divider, said first resistor connecting said wiper to the base of said first transistor.

4. The combination of claim 3 including third means connecting the emitter of said first transistor to said other terminal.

5. A control for a load presenting a varying current demand comprising: chassis means including a heat sink, said chassis means having first and second terminals for connection to a source of voltage, a first transistor mounted to said chassis means, said first transistor having its collector connected to said first terminal, said chassis means having a third terminal, first means connecting said third terminal to the base of said first transistor, voltage divider means spaced from said chassis means, conductor means connecting the opposite ends of said voltage divider means to said first and second terminals, respectively, a wiper on said voltage divider means, conductor means connecting said wiper to said third terminal, a second transistor mounted in heat exchange relation to said heat sink, said second transistor having its collector connected to said first terminal, second means connecting the emitter of said first transistor to the base of said second transistor, said chassis means having a fourth terminal connected to the emitter of said second transistor, said second terminal and said fourth terminal adapted to have said load connected therebetween.

6. The control of claim 5 wherein said first and second means each includes a resistance.

7. The control of claim 5 wherein said first and second transistors are NPN transistors, said chassis means being electrically conductive and being electrically in common to said second terminal, and including means insulating said first, third and fourth terminals from said chassis means.

References Cited

UNITED STATES PATENTS

| | | | |
|---|---|---|---|
| 2,936,404 | 5/1960 | Simone | 315—297 X |
| 2,984,774 | 5/1961 | Race | 317—234 |
| 3,220,471 | 11/1965 | Coe. | |
| 3,222,571 | 12/1965 | Timm. | |
| 3,360,734 | 12/1967 | Kimball et al. | 330—32 X |

J D MILLER, Primary Examiner

G. GOLDBERG, Assistant Examiner

U.S. Cl. X.R.

315—297; 317—235; 323—4